(12) United States Patent
Kanczuzewski et al.

(10) Patent No.: US 7,713,008 B2
(45) Date of Patent: May 11, 2010

(54) METHOD AND DEVICE FOR MAKING A CARGO DECK

(75) Inventors: Thomas E. Kanczuzewski, South Bend, IN (US); John Townsend, Paw Paw, MI (US); John W. Doster, Granger, IN (US); Dean Catanzarite, South Bend, IN (US)

(73) Assignee: Logistick, Inc., South Bend, IN (US)

( * ) Notice: Subject to any disclaimer, the term of this patent is extended or adjusted under 35 U.S.C. 154(b) by 411 days.

(21) Appl. No.: 11/857,981

(22) Filed: Sep. 19, 2007

(65) Prior Publication Data

US 2009/0074530 A1 Mar. 19, 2009

(51) Int. Cl.
*B60P 7/08* (2006.01)

(52) U.S. Cl. .................. 410/89; 410/143; 410/144; 410/152

(58) Field of Classification Search .......... 410/46, 410/89, 90, 91, 129, 143, 144, 152; 105/370; 211/191, 192, 105.1, 206; 248/357, 205.3
See application file for complete search history.

(56) References Cited

U.S. PATENT DOCUMENTS

| 969,002 | A | 8/1910 | Teachout |
|---|---|---|---|
| 1,401,419 | A | 12/1921 | McNally |
| 1,951,660 | A | 3/1934 | Klaudt |
| 2,124,082 | A | 7/1938 | Reifer |
| 2,414,160 | A | 1/1947 | Moon |
| 2,464,080 | A | 3/1949 | Hankins |
| 2,467,681 | A | 4/1949 | McKinney |
| 2,468,101 | A | 4/1949 | Nampa |
| 2,697,631 | A | 12/1954 | Miller |
| 2,752,864 | A | 7/1956 | McDougal, Sr. et al. |
| 2,766,704 | A | 10/1956 | McMahon |
| 2,845,245 | A | 5/1958 | Gray et al. |
| 2,912,939 | A | 11/1959 | Miner, Jr. et al. |
| 2,980,037 | A | 4/1961 | Elsner |
| 2,993,708 | A | 7/1961 | Holman, Jr. |
| 3,177,007 | A | 4/1965 | Oren |
| 3,344,750 | A | 10/1967 | Kostrewa |
| 3,559,591 | A | 2/1971 | Breen et al. |
| 3,590,746 | A | 7/1971 | Gibson |
| 3,712,663 | A | 1/1973 | Laven |
| 3,836,174 | A | 9/1974 | Holman, Jr. |
| 3,995,565 | A | 12/1976 | Kersey |
| 4,026,508 | A | 5/1977 | Ziegler |
| 4,080,906 | A | 3/1978 | Brown |

(Continued)

FOREIGN PATENT DOCUMENTS

GB 1209255 10/1970

*Primary Examiner*—Stephen Gordon
(74) *Attorney, Agent, or Firm*—Barnes & Thornburg LLP

(57) ABSTRACT

A method of making a deck for storing cargo in a shipping vehicle comprising: securing two pairs of braces to opposed surfaces associated with the shipping vehicle by engaging opposed ends of first elongated supports with the pair of braces such that each first elongated support interconnects one of the pairs of braces and extends substantially parallel to a base associated with the shipping vehicle; engaging second elongated supports with each of the braces, each second elongated support interconnecting a respective brace and the base; and positioning a decking on the first elongated supports for supporting the cargo. A brace for making the cargo deck engageable with a horizontally-extending support and a vertically-extending support.

8 Claims, 5 Drawing Sheets

U.S. PATENT DOCUMENTS

| | | |
|---|---|---|
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,498,824 A | 2/1985 | Kinkle |
| 4,616,757 A | 10/1986 | Hobson |
| 4,700,918 A | 10/1987 | Andrasko, Jr. |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,156,110 A | 10/1992 | Fuller |
| 5,219,251 A | 6/1993 | Kanczuzewski |
| 5,259,712 A | 11/1993 | Wayne |
| 5,281,063 A | 1/1994 | Austin, III |
| 5,320,464 A | 6/1994 | Long et al. |
| 5,326,204 A | 7/1994 | Carlson et al. |
| 5,362,184 A | 11/1994 | Hull et al. |
| 5,370,482 A | 12/1994 | Long |
| 5,494,389 A | 2/1996 | Kanczuzewski |
| 5,688,087 A | 11/1997 | Stapleton et al. |
| 5,807,047 A | 9/1998 | Cox |
| 6,086,299 A | 7/2000 | Kanczuzewski |
| 6,533,513 B2 | 3/2003 | Kanczuzewski et al. |
| 6,874,982 B2 * | 4/2005 | Rhodes ...................... 410/152 |

* cited by examiner

METHOD AND DEVICE FOR MAKING A CARGO DECK

The present invention relates generally to a method and device for making a cargo deck in a shipping vehicle.

BACKGROUND

Cargo transported for commercial and other uses is often shipped in semi-trailers or other trucks, railcars, ships, aircraft or other shipping vehicles. Stacking of the cargo within the shipping vehicle may provide efficiencies, however, certain types of cargo might not be readily stackable due to a variety of different reasons such as the nature or configuration of the cargo.

SUMMARY

The present disclosure is directed to a method and device for making a cargo deck in a shipping vehicle. The method includes securing a brace to one of a pair of opposed walls or other opposed surfaces associated with the shipping vehicle by positioning the brace on the surface and engaging an end of a first elongated support, such as, for example, a 4"×4" wooden support, with the brace such that the first elongated support extends substantially parallel to a floor or other base associated with the shipping vehicle; engaging a second elongated support, such as, for example, a 2"×4" wooden support, with the brace and with the floor; and positioning a decking on the first elongated support.

The method also includes securing an other brace to the other of the opposed walls associated with the shipping vehicle by positioning the other brace on the other walls and engaging an other end of the first elongated support with the other brace; and engaging an other second elongated support with the other brace and the floor. The method also includes securing an other pair of braces with an other first elongated support and an other pair of second elongated supports and positioning the decking over the other first elongated support. When the first elongated support is positioned in place between the two braces, the first elongated support is in compression and thus exerts a tensile or axial force on the braces and the walls, causing the walls to exhibit resilient properties.

The present disclosure is also directed to the brace for making the cargo deck. The brace comprises a receptacle including a receptacle wall defining a cavity for receiving the end of the first elongated support for securing the brace to the wall of the shipping vehicle and including a pair of rails defining a slot for receiving an end of the second elongated support. The pair of rails may be parallel to each other and may extend substantially the entire height of the receptacle. The brace may comprise a ramp for receiving the end of the elongated support into the receptacle. The ramp may define a slot for receiving cargo strapping.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
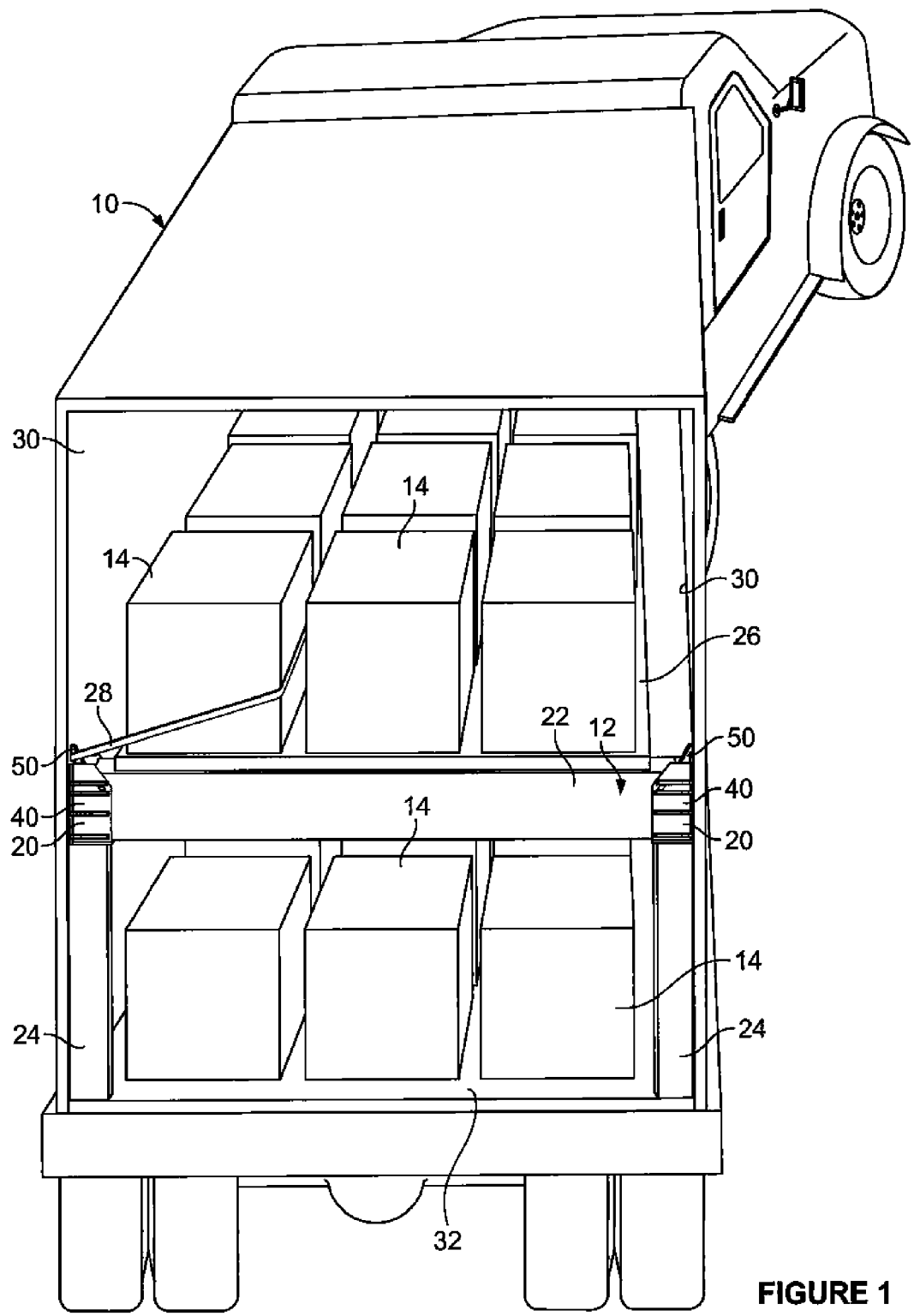
FIG. 1 is a perspective view of a truck containing cargo and a cargo deck in accordance with an illustrated embodiment of the present disclosure.
Figure 2:
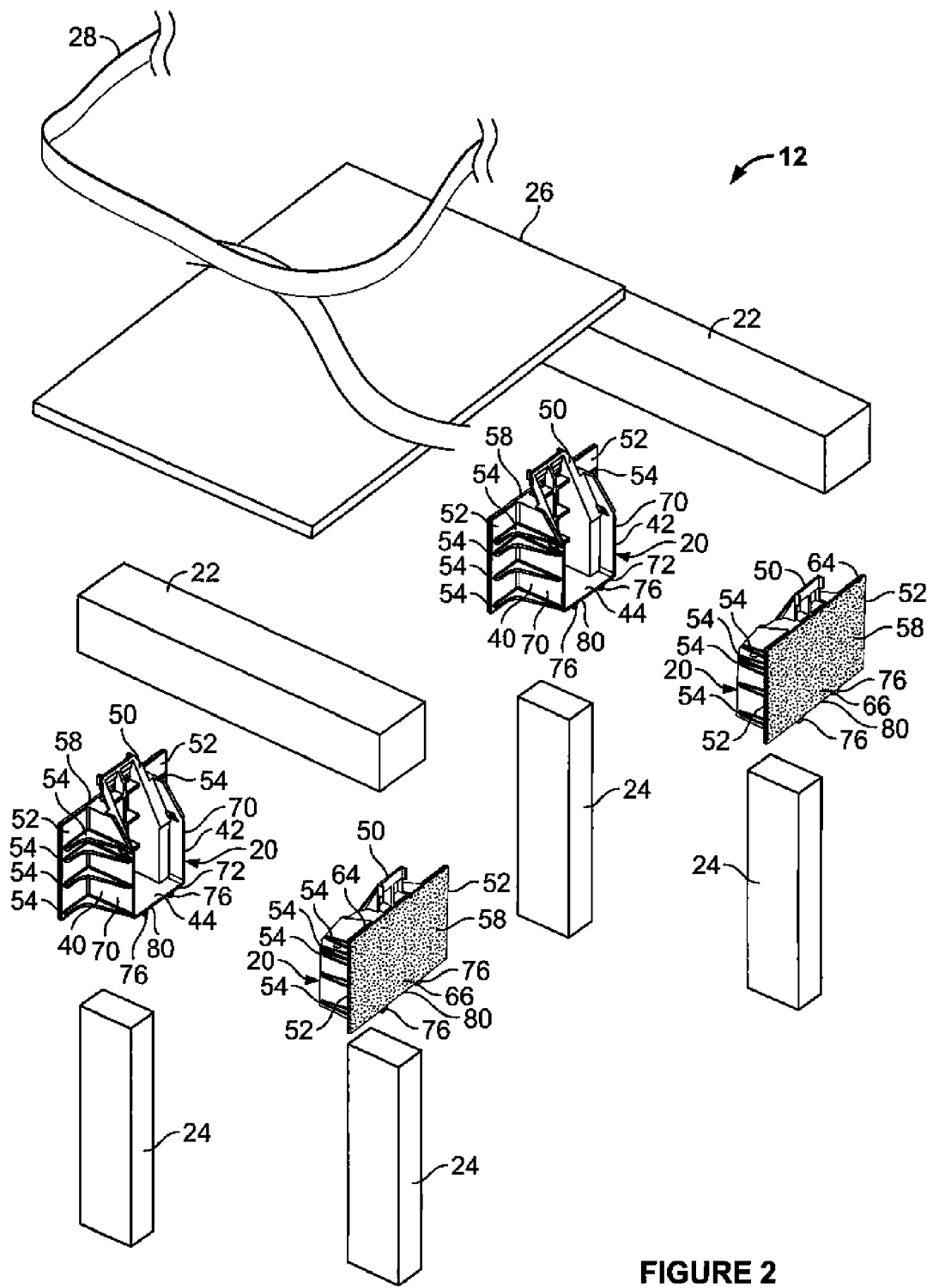
FIG. 2 is a partial, enlarged and exploded view of the cargo deck of FIG. 1.
Figure 3:
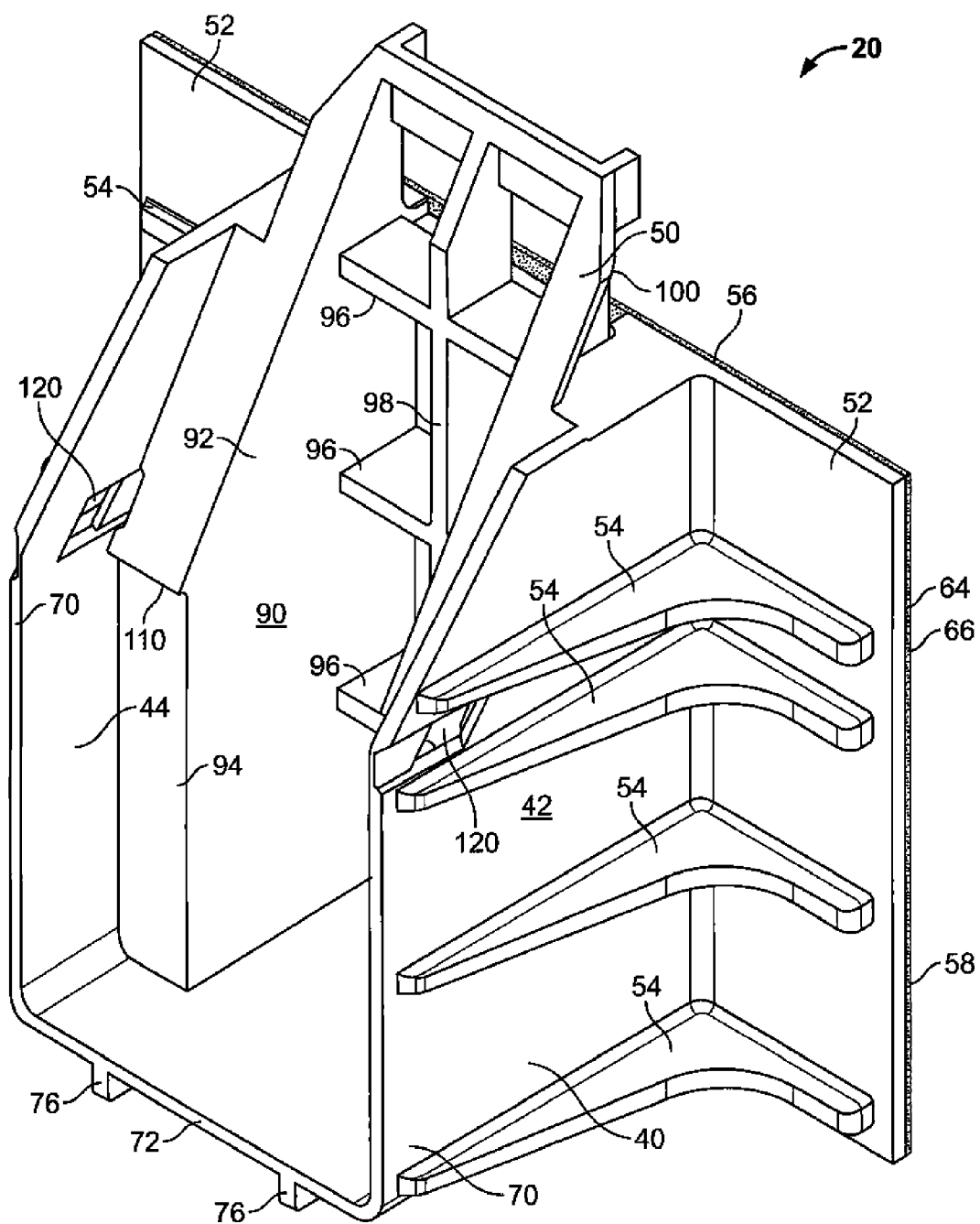
FIG. 3 is a perspective view of one of the braces of the cargo deck of FIG. 1.
Figure 4:
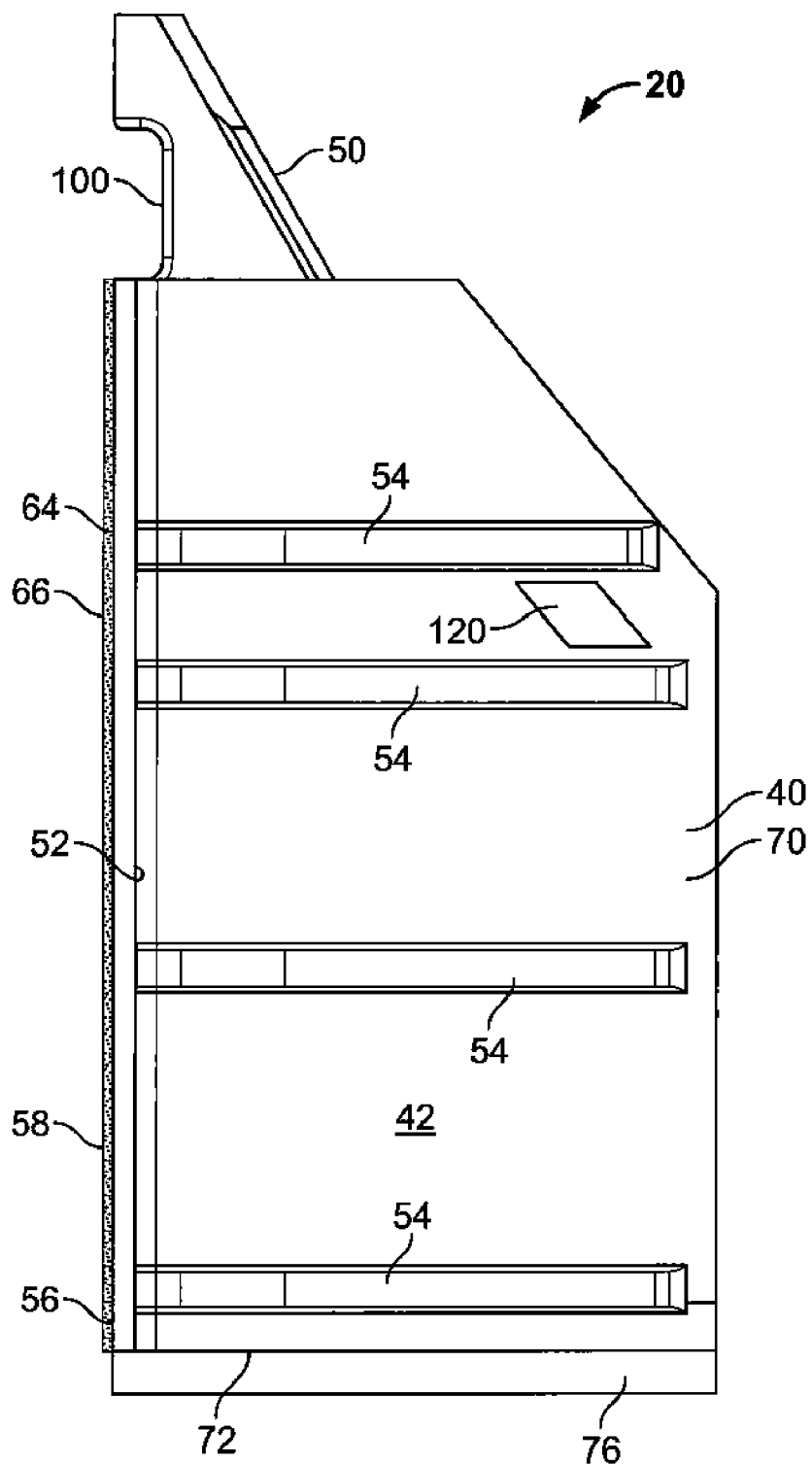
FIG. 4 is a side plan view of one of the braces of the cargo deck of FIG. 1.
Figure 5:
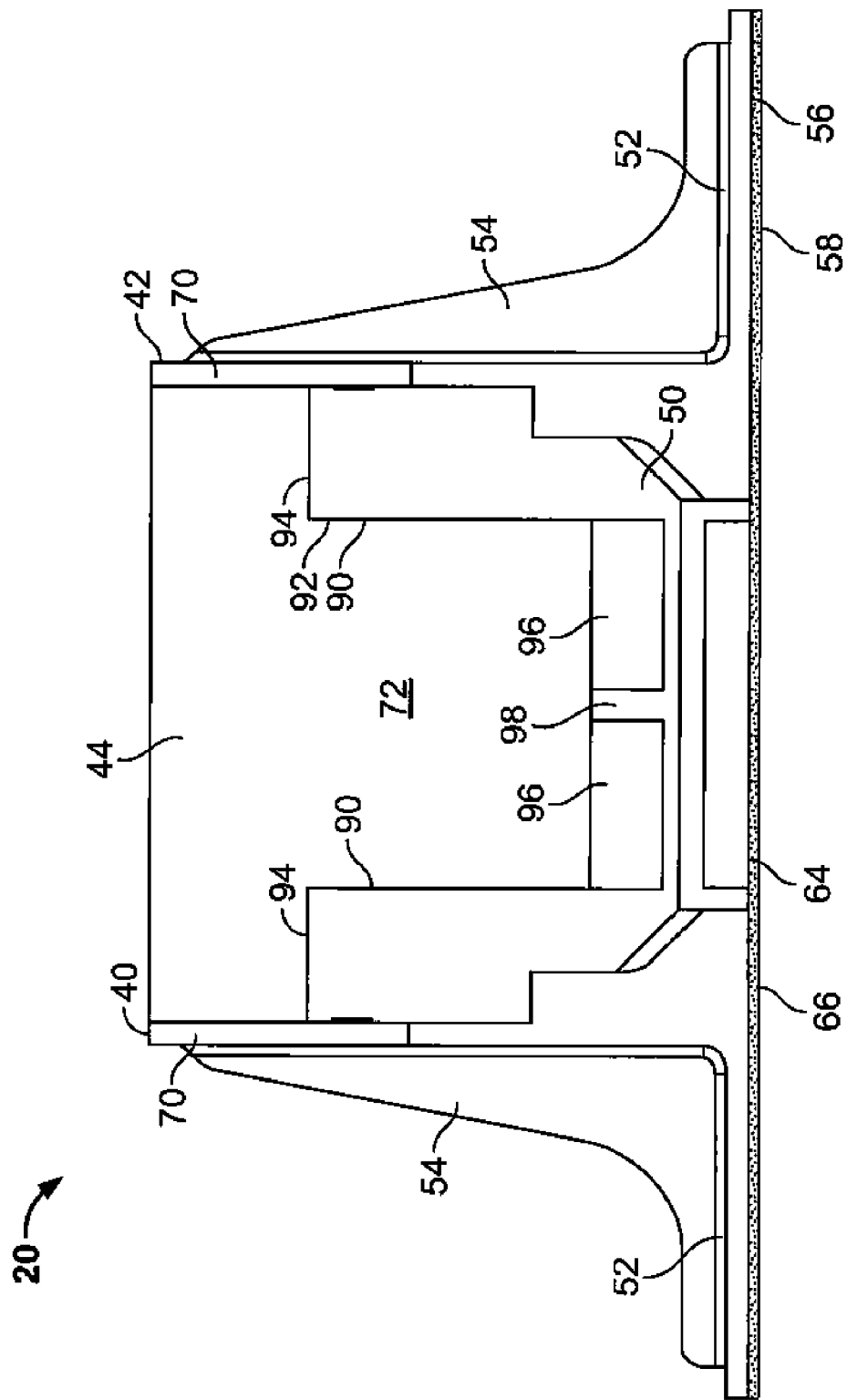
FIG. 5 is a front plan view of one of the braces of the cargo deck of FIG. 1.

FIG. 1 illustrates a truck 10 containing a cargo deck 12 in accordance with an illustrated embodiment of the present disclosure having cargo 14 disposed thereon. The cargo deck 12 comprises a plurality of braces 20, a plurality of first elongated supports 22 extending horizontally, a plurality of second elongated supports 24 extending vertically, and decking 26 supporting cargo 14 in the truck 10. The cargo deck 12 also includes cargo strapping 28 for securing some or all of the cargo 14 on the cargo deck. The illustrated truck 10 includes a pair of opposed walls 30 and a floor 32. The braces 20 are secured to the opposed walls 30 by the first elongated supports 22, and the braces 20 and decking 26 are further vertically supported by the second elongated supports 24. The truck 10 can instead be in the form of any other type of shipping vehicle, including, for example, any other type of truck or any type of railcar, ship, aircraft or other vehicle.

In the embodiment of FIG. 1, the decking 26 is supported by the braces 20, the two first elongated supports 22 and the four second elongated supports 24. The braces 20 of each pair of interconnected braces are secured on the opposed walls 30 of the truck 10 and are interconnected by one of the first elongated supports 22 extending above and parallel to the floor 32 of the truck. Each of the elongated supports 22 is in compression and thus exerts a tensile force on the respective pair of braces 22 and the opposed walls 30. Additionally, each brace 20 is further supported vertically by one of the elongated supports 24 which extends from the brace to the floor 32 of the truck 10 to thereby interconnect the brace and the floor. Thus, each pair of braces 20 engages one elongated member 22, which extends horizontally; and each brace 20 engages one elongated member 24, which extends vertically.

The braces 20 in accordance with the present disclosure may have any suitable construction and configuration. In the illustrated embodiment, for example, each brace 20 includes a receptacle 40 including a receptacle wall 42 that defines an open-ended cavity 44 for receivably engaging one end of one of the first elongated supports 22. The brace 20 also includes a ramp 50 leading into the open end of the cavity 44, a pair of lateral flaps 52, a plurality of gussets 54 interconnecting the lateral flaps 52 and the receptacle wall 42, a wall-engaging bottom surface 56, and an adhesive 58 disposed on the wall-engaging bottom surface 56. The cavity 44 is sized to receive an end of an first elongated support 22 in the form of a 4"×4" wooden support, but the cavity may have any other size and configuration and may be sized to receive any other type of elongated support in accordance with other embodiments of the present disclosure. The adhesive 58 may be in the form of a two-sided tape 64 with a removable release layer 66, or may be in any other suitable form in accordance with other embodiments of the present disclosure.

The receptacle wall 42 includes a pair of lateral walls 70 and a base wall 72 interconnecting the lateral walls defining the open-ended cavity 44. The receptacle wall 42 also includes a pair of rails 76 on the base wall opposite the cavity 44. The rails 76 extend parallel to each other substantially the entire height of the receptacle wall 42 and define a slot 80 for receiving an end of the second elongated support 24. The rails 76 are spaced a sufficient distance to engage the end of a second elongated support 24 in the form of a 2"×4" wooden support. The rails 76 may have any other spacing or any other suitable construction and configuration suitable to engage a 2"×4" wooden support or any other type of elongated support in accordance with other embodiments of the present disclosure and may depend upon the configuration of the elongated support. Further, the slot 80 may instead have any other size and configuration, and may be comprised of structure other than the rails 76, or may be disposed at any other location on the brace 20 in accordance with other embodiments of the present disclosure.

The brace 20 may be constructed of plastic and have a monolithic construction, and may be formed by injection molding. The brace 20 may be constructed of any suitable plastic resin or other plastic. The brace 20 may be constructed by any other suitable means and may have any other suitable monolithic or other construction in accordance with other embodiments of the present disclosure. The decking 26 may be plywood or may be constructed of any other suitable material depending upon the cargo being transported.

The receptacle 40 of the brace 20 also includes a pair of opposed walls 90 disposed between the pair of lateral walls 70 of the receptacle defining a channel 92 therebetween. The pair of opposed walls 90 extend from their base to a lesser height than the lateral walls 70 of the receptacle 40. The receptacle 40 also includes a pair of engaging surfaces 94 which join the lateral walls 70 with the tops of the opposed walls 90 for engaging the respective end of the first elongated support 22 when it is in the receptacle 40 and which define a base of the cavity 44. The walls 90 and the engaging surfaces 94 also form the ramp 50 that extends adjacent the cavity 44 to facilitate a camming or wedging receipt of the end of the first elongated support 22 into the cavity and engagement between the receptacle 40 and the first elongated support 22. In addition, the receptacle 40 includes a pair of lateral ribs 96 interconnecting the pair of opposed walls 90 and a central rib 98 to add strength and rigidity to the brace 20.

The opposed walls 90 of the ramp 50 define a pair of slots 100 for receiving the cargo strapping 28 for restraining cargo movement to provide further cargo transportation benefits. The cargo strapping 28 can be any suitable form of strapping that can be received by the slots 100 to restrain some or all of the cargo 14 disposed on the cargo deck 12 or disposed anywhere else in the truck 10.

The engaging surfaces 94 include lips 110 for maintaining the first elongated support 22 in the cavity 44. The height of the opposed walls 90 relative to the lateral flaps 52 is illustrated as being constant from the base wall 72 toward the ramp 50, and then decreases along part of the length of the ramp. The ramp 50 extends outward beyond the opposed walls 90.

The gussets 54 are spaced along the lateral walls 70 of the receptacle 40 and the lateral flaps 52, providing additional structural support to the brace 20. Each gusset 54 is joined to the lateral wall 70, and the lateral flap 52. Any other suitable numbers of gussets 54 can be used in accordance with the present disclosure. Further, the gussets 54 may have any other suitable structure or may even be eliminated in accordance with other embodiments of the present disclosure.

Each brace 20 further includes tamper proofing means comprising a pair of holes 120 defined on the lateral walls 70 of the receptacle 40 and a tie or cable (not shown) for interconnecting the holes 120 after the elongated support has been positioned in the receptacle 40. The tie or cable may include a clamp, or zip tie or include any other structure that cannot be removed without being cut or destroyed. The tie or cable is secured after the elongated support 22 has been positioned in receptacle 40 to provide tamper evident benefits. Upon arrival of the cargo, the tie or cable can be inspected and, if it has been cut or removed prior to arrival, there is evidence that the cargo deck 10 has been tampered with during shipment.

The cargo deck 12 in accordance with the present disclosure may be constructed or otherwise made in any suitable manner. For example, one pair of braces 20 may be positioned on the opposed walls 30 with the ramps 50 facing upward, and secured to the opposed walls by the adhesive 58. One first elongated support 22 may be engaged with the pair of braces 20 by inserting opposed ends of the first elongated support 22 into the cavities 44 of the receptacles 40 of the braces such that the elongated support extends above and across the floor 32 of the truck 10. The other pair of braces 20 may then be secured to the opposed walls 30 in a similar manner at a distance from the first pair of braces.

When engaging the first elongated support 22 with the braces 20, the first elongated support 22 may be positioned relative to the braces and raised slightly vertically above the receptacles 40. The first elongated support 22 is then placed adjacent one or both of the ramps 50 of the braces 20. The first elongated support 22 is then lowered until it contacts one or both ramps 50. After the first elongated support 22 contacts one or both of the ramps 50, pressure is applied to cause the first elongated support to cam or wedge into one or both of the cavities 44 of the pair of braces 20. Once the first elongated support 22 is wedged into place, the first elongated support is in compression and thus exerts a tensile or axial force on the braces 20 and thus the walls 30 of the truck 10, causing the wall 30 to exhibit resilient properties. The result is that the braces 20 are locked firmly in place.

Before or after the first elongated supports 22 are positioned in place, one of the second elongated supports 24 is disposed between each brace 20 and the floor 32 to provide further vertical support for the cargo 14. The decking 26 is then disposed on the pair of first elongated supports 22. Any suitable cargo 14 can then be disposed on the decking 26 or beneath the decking. Additionally, cargo strapping 28 can be used to restrain cargo 14 in any suitable manner such as, for example, by engaging the cargo strapping with the slots 100 of one or more of the braces 20, wrapping the cargo strapping around some or all of the cargo, and engaging the cargo strapping with the slots of one of the other braces. The tamper proofing means can also be used to provide tamper evident benefits.

The steps for making the cargo deck 12 set forth above can be accomplished in any suitable order. Further, depending upon other structure within or otherwise associated with the shipping vehicle, the cargo deck 12 can be made by using more or less than four braces 20 in accordance with other embodiments of the present disclosure. Still further, although the braces 20 of the illustrated cargo deck 12 are secured to the opposed walls 30 of the shipping vehicle, depending upon other structure within or otherwise associated with the shipping vehicle, the braces can instead be secured to any other opposed surfaces associated with a shipping vehicle, such as other cargo or any other secure structure in accordance with other embodiments of the present disclosure. Similarly, the braces 20 of the illustrated cargo deck 12 are interconnected with the floor 32 of the shipping vehicle, but can instead be interconnected with any other base associated with the shipping vehicle, such as other cargo or any other base in accordance with other embodiments of the present disclosure.

The cargo deck 12 in accordance with the present disclosure provides many advantages. For example, cargo 14 can be stacked on or underneath the cargo deck 12, and thus, the cargo deck can be used for stacking over cargo that may not be readily stacked in a shipping vehicle because of the nature or configuration of the cargo, such as, for example, cargo that is likely to be damaged, broken and/or crushed if stacked such as, for example, valuables, dishes, glassware and other glass items, plants, bushes, trees, food items, etc.

Further, the cargo deck 12 in accordance with the illustrated embodiment can be readily constructed in the shipping vehicle without the need for any tools. Also, the braces 20 tend to be inexpensive to manufacture and thus disposable and the first and second elongated supports 22 and 24 also tend to be inexpensive and readily reusable. Thus, such components do not need to be recovered after use or tracked during shipment. Therefore, the cargo deck in accordance with the illustrated embodiment provides a efficient and inexpensive manner for storing cargo in a shipping vehicle.

The lateral flaps 52 of each brace 20 reduce, if not eliminate, the possibility that the brace will roll over as a result of the a shearing stress applied by the first elongated support 22 in either direction. The lateral flaps 52 similarly reduce, if not eliminate, the possibility that the brace 20 will roll back in response to a shearing stress applied by the first elongated support 22 in a back direction. Further, the lateral flaps 52 provide additional surface area for the adhesive 58 and thus additional surface area for engaging the walls 30 of the shipping vehicle. The gussets 54 add strength and rigidity to the receptacle and also transfer to the lateral flaps 52 any shearing force caused by the first elongated support 22. The ribs 96 included in the receptacle 40 also add strength thereto in a cost effective manner.

While embodiments have been illustrated and described in the drawings and foregoing description, such illustrations and descriptions are considered to be exemplary and not restrictive in character, it being understood that only illustrative embodiments have been shown and described and that all changes and modifications that come in the spirit of the disclosure are desired to be protected. The description and figures are intended as illustrations of embodiments of the disclosure, and are not intended to be construed as having or implying limitation of the disclosure to those embodiments.

There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall in the spirit and scope of the present disclosure and the appended claims.

The invention claimed is:

1. A method of making a deck for storing cargo in a shipping vehicle comprising:
    (a) securing a pair of braces to a pair of opposed surfaces associated with the shipping vehicle by engaging opposed ends of a first elongated support with the pair of braces such that the first elongated support interconnects the pair of braces and extends substantially parallel to a base associated with the shipping vehicle;
    (b) engaging a pair of second elongated supports with the pair of braces, each second elongated support interconnecting a respective one of the braces and the base; and
    (c) positioning a decking on the first elongated support for supporting the cargo.

2. The method of claim 1 further including:
    (d) securing an other pair of braces to the pair of opposed surfaces by engaging opposed ends of an other first elongated support with the other pair of braces such that the other first elongated support interconnects the other pair of braces and extends substantially parallel to the base;
    (e) engaging an other pair of second elongated support with the other pair of braces, each of the other second elongated supports interconnecting a respective brace of the other pair of braces and the base; and
    (f) positioning the decking on the other first elongated support.

3. The method of claim 1 wherein (b) includes disposing an end of each second elongated support in a slot defined by the respective brace.

4. The method of claim 1 wherein (b) includes disposing an end of each second elongated support in a slot defined by a pair of rails of the respective brace.

5. The method of claim 1 wherein (b) includes disposing an end of each second elongated support in a slot defined by a pair of parallel rails of the respective brace.

6. The method of claim 1 wherein (b) includes engaging an end of each second elongated support with a pair of rails of the respective brace, the rails of each respective brace extending parallel to each other along an entire height of the brace and defining a slot receiving the end of the respective second elongated support.

7. The method of claim 1 wherein the engaging of (a) includes disposing each opposed end of the first elongated support in a cavity defined by a receptacle of the respective brace.

8. The method of claim 7 wherein (b) includes disposing an end of each second elongated support in a slot defined by the receptacle of the respective brace.

* * * * *